US007240854B2

(12) United States Patent
Taylor

(10) Patent No.: US 7,240,854 B2
(45) Date of Patent: Jul. 10, 2007

(54) EYEWASH WITH AUTOMATIC STAGNANT WATER FLUSHING SYSTEM

(76) Inventor: Thomas M. Taylor, 481 Curica Rd., Naples, FL (US) 34108

( * ) Notice: Subject to any disclaimer, the term of this patent is extended or adjusted under 35 U.S.C. 154(b) by 118 days.

(21) Appl. No.: 10/864,743

(22) Filed: Jun. 9, 2004

(65) Prior Publication Data

US 2005/0273925 A1 Dec. 15, 2005

(51) Int. Cl.
*G05D 23/00* (2006.01)
*E03C 1/00* (2006.01)

(52) U.S. Cl. ...................... 236/93 R; 236/46 R; 4/620; 4/650; 4/653; 4/682; 4/688

(58) Field of Classification Search .............. 236/93 R, 236/12.11, 12.12, 12.13, 46 R, 46 D; 4/620, 4/650, 653, 682, 688
See application file for complete search history.

(56) References Cited

U.S. PATENT DOCUMENTS 2,752,307 A 6/1956 Baran et al.
3,103,946 A 9/1963 Troxell
3,592,212 A 7/1971 Schleimer
3,962,733 A 6/1976 Parry
4,212,424 A 7/1980 Fortune
4,216,185 A 8/1980 Hopkins
RE31,023 E 9/1982 Hall, III
4,483,189 A 11/1984 Seal
4,639,718 A 1/1987 Gasper
4,721,408 A 1/1988 Hewlett
4,774,978 A 10/1988 Lepine, Jr. et al.
4,838,485 A 6/1989 Rinkewich
4,876,530 A 10/1989 Hill et al.
4,898,107 A 2/1990 Dickinson
5,002,428 A 3/1991 Shettel
5,011,598 A 4/1991 Nathanson
5,025,754 A 6/1991 Plyler
5,133,622 A 7/1992 Hewlett
5,136,983 A 8/1992 Hostetler et al.
5,184,571 A 2/1993 Hostetler et al.
5,227,067 A 7/1993 Runyon
5,227,068 A 7/1993 Runyon
5,249,745 A 10/1993 Bertolotti
5,261,348 A 11/1993 Niehaus et al.
5,264,368 A 11/1993 Clarke et al.
5,314,619 A 5/1994 Runyon
5,324,665 A 6/1994 Lessard
5,331,694 A 7/1994 Mackenzie et al.
5,332,494 A 7/1994 Eden et al.
5,368,227 A 11/1994 McGinnis
5,479,338 A 12/1995 Ericksen et al.
5,480,562 A 1/1996 Lemelson
5,490,561 A 2/1996 Cardoso-Neto et al.

(Continued)

*Primary Examiner*—Marc Norman
(74) *Attorney, Agent, or Firm*—Akerman Senterfitt

(57) ABSTRACT

Eyewash stations can go through extended periods of disuse, allowing for the growth of bacteria and other substances in the stagnant water in the supply passages. Water dispensed from such the eyewash station can come into contact with or be consumed by a user. Embodiments of the invention provide a system that can automatically flush stagnant water from eyewash stations on a timed basis to minimize the possibility that contaminated water is delivered to a user. In addition, the automatic stagnant water flushing system according to embodiments of the invention can provide temperature-based flushing systems to avoid the dangers or discomfort associated with the delivery of excessively hot or cold water to a user.

29 Claims, 12 Drawing Sheets

U.S. PATENT DOCUMENTS

| | | | |
|---|---|---|---|
| 5,527,470 | A | 6/1996 | Suda |
| 5,540,845 | A | 7/1996 | Blanchard et al. |
| 5,587,055 | A | 12/1996 | Hartman et al. |
| 5,609,124 | A | 3/1997 | Leclerc |
| 5,623,990 | A | 4/1997 | Pirkle |
| 5,775,372 | A | 7/1998 | Houlihan |
| 5,813,363 | A | 9/1998 | Snelling |
| 5,817,231 | A | 10/1998 | Souza |
| 5,921,207 | A | 7/1999 | DiSalvo et al. |
| 5,921,270 | A | 7/1999 | McCarty |
| 6,035,704 | A | 3/2000 | Newman |
| 6,044,911 | A | 4/2000 | Haase, III |
| 6,062,259 | A | 5/2000 | Poirier |
| 6,358,408 | B1 | 3/2002 | Newman |
| 6,385,794 | B1 | 5/2002 | Miedzius et al. |
| 6,520,431 | B2 | 2/2003 | Donovan |
| 6,635,172 | B2 | 10/2003 | Newman |
| 6,711,758 | B1 | 3/2004 | Terek et al. |

EYEWASH WITH AUTOMATIC STAGNANT WATER FLUSHING SYSTEM

FIELD OF THE INVENTION

The invention relates in general to water delivery systems and, more particularly, to a water flushing apparatus for automatically maintaining water quality in water delivery systems.

BACKGROUND OF THE INVENTION

Various systems are known in the art that deliver water for human use and consumption. Examples of such devices include safety showers, emergency eye wash stations, sinks, and drinking fountains. Some of these water delivery systems, by their very nature, are only contemplated as being used on an infrequent basis. For example, eye wash stations and safety showers are provided for emergency situations in which the eyes, face, skin and/or body of a person are exposed to harmful or irritable substances. Other devices, such as sinks and drinking fountains, may appear to be used more regularly, but there are numerous instances in which such devices may go through extended periods of disuse. For example, houses may have seasonal occupants, or certain sections of a building, such as a hospital, school or industrial plant, may be used less frequently compared to other areas.

Regardless of the specific device or particular setting, any interval of disuse of such water delivery devices can allow bacteria and other undesired substances to grow or form in the stagnant water in the supply lines. A user of one of these devices may unsuspectingly be exposed to contaminated water, potentially exacerbating or causing additional problems for the user. In addition to these hazards, stagnant water in the supply line may become excessively hot or cold depending on the environment in which the water delivery system is located. Water at such temperature extremes can be harmful to the user, and it can be detrimental to the water delivery system itself.

Thus, there is a need for a system to enhance the water quality in these water delivery systems by automatically purging water therefrom on a time basis or a time/temperature basis.

SUMMARY OF THE INVENTION

Embodiments of the invention relate to an emergency eyewash or facewash having an automatic stagnant water flushing system. The emergency eyewash includes an eyewash station. The emergency eyewash further includes a flow controlled passage having an inlet adapted for fluid connection to a pressurized water distribution system and an outlet adapted for fluid connection to the eyewash station. An eyewash valve is disposed along the flow controlled passage for selectively permitting and prohibiting the flow of pressurized water through the flow controlled passage and into the eyewash station.

A discharge passage branches from the flow controlled passage upstream of the eyewash station. A discharge valve is disposed along the discharge passage for selectively permitting and prohibiting the flow of pressurized water through the discharge passage. The system further includes a programmable controller for regulating the flow of pressurized water through the discharge passage by activating and deactivating the discharge valve. As a result, stagnant water can be flushed from the flow controlled passage to maintain water quality in the flow controlled passage as delivered to the eyewash station. In addition to time based flushing, embodiments of the invention can provide temperature based flushing.

DETAILED DESCRIPTION OF EMBODIMENTS OF THE INVENTION

A flushing system according to aspects of the invention will be explained herein in the connection with various water delivery systems. However, it will be understood that the detailed description is intended only as exemplary. The embodiments of the invention shown in FIGS. 1–14 are not intended to limit the invention to the illustrated structure or application. One skilled in the art will readily appreciate the numerous applications in which embodiments of the invention can be employed.

Figure 1:
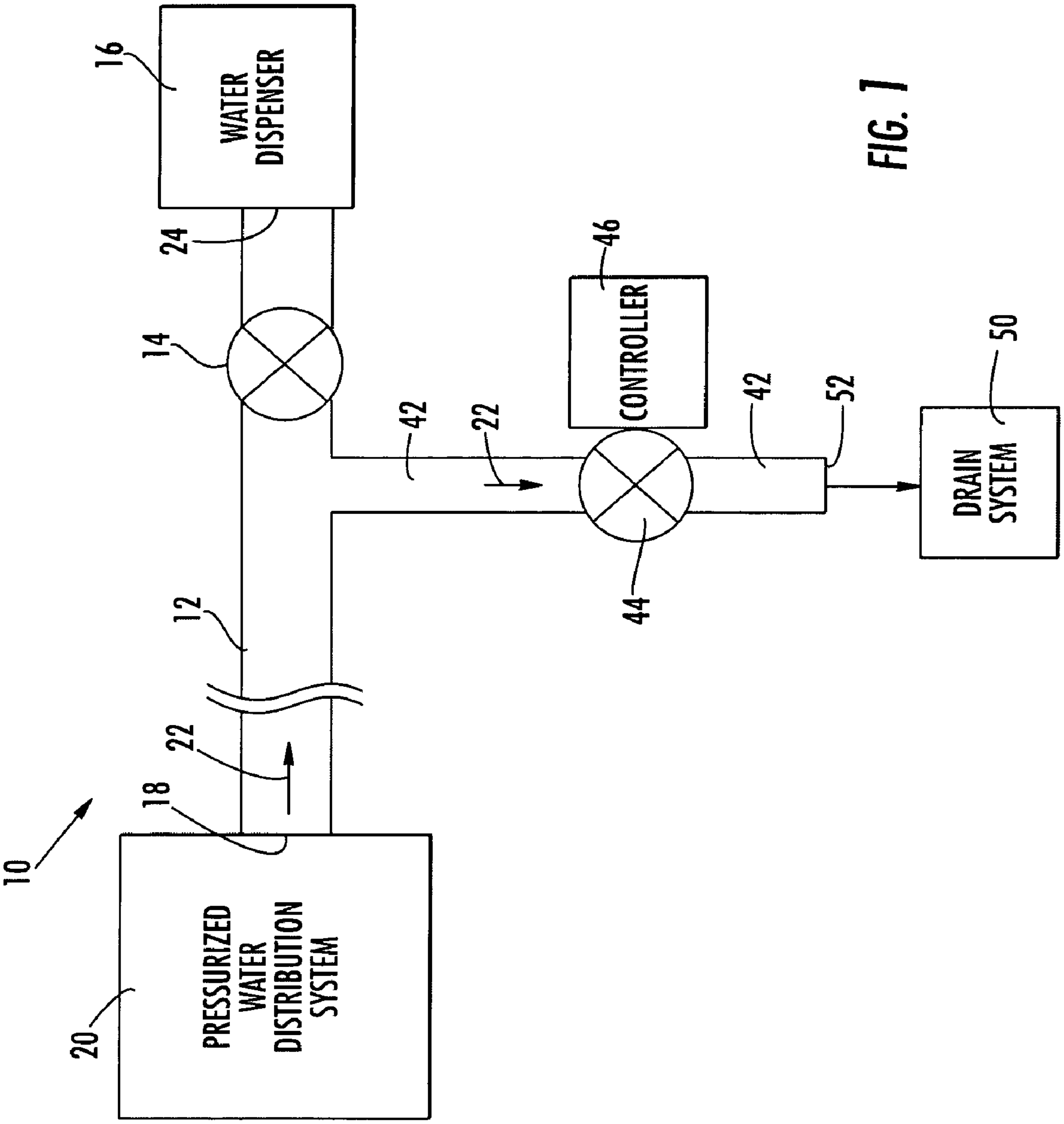
FIG. 1 shows a water dispenser having a flushing system in accordance with embodiments of the invention.

Referring to FIG. 1, a water delivery system 10 can include a flow controlled passage 12, a flow control valve 14 and a water dispenser 16. Each of these components will be discussed in turn below. The flow controlled passage 12 can have an inlet 18 adapted for fluid connection to a pressurized water distribution system 20, which can be, for example, a municipal water system. The term "fluid connection," as used herein, is intended to cover a wide range of connections, both direct and indirect as well as permanent and detachable connections, so long as pressurized water 22 can flow into the flow controlled passage 12. The inlet 18 can be directly connected to the water distribution system 20 by, for example, threaded engagement, adhesives or welding. One example of an indirect connection between the inlet 18 and the water distribution system 20 is a fastener, such as a coupling, disposed between the inlet 18 and the water distribution system 20. The flow controlled passage 12 can have an outlet 24 adapted for fluid connection to a water dispensing device 16.

Embodiments of the invention are not limited to any specific flow controlled passage 12. For example, the flow controlled passage 12 can be formed by one or more components. In one embodiment, the flow controlled passage can be made of a single pipe. Alternatively, the flow passage 12 can be made of two or more pipes, tubes, hoses and/or fasteners, such as nipples, unions, couplings, and elbows, just to name a few possibilities. Likewise, the flow controlled passage 12 can be made of a number of materials including any suitable metal or plastic. The flow controlled passage 12 can be substantially straight or it can include one or more curves or bends as needed. Further, the cross-sectional area of the flow controlled passage 12 can be substantially constant along its length, or it can vary along the length of the passage or in local areas. The flow controlled passage 12 is not limited to any specific geometry. For instance, the passage 12 can be substantially circular, oval, square, rectangular, or triangular, just to name a few possibilities. The geometry of the passage 12 can be substantially constant or it can vary along the length of the passage. At least a portion of the flow controlled passage 12 can be located above ground or below the ground, depending on the application at hand.

Figure 6B:
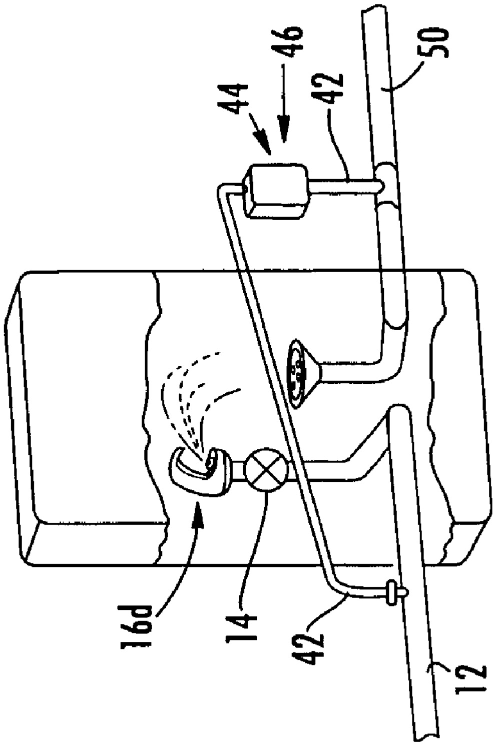
FIG. 6B shows a rear isometric view of a drinking fountain having a flushing system in accordance with embodiments of the invention.
Figure 6A:
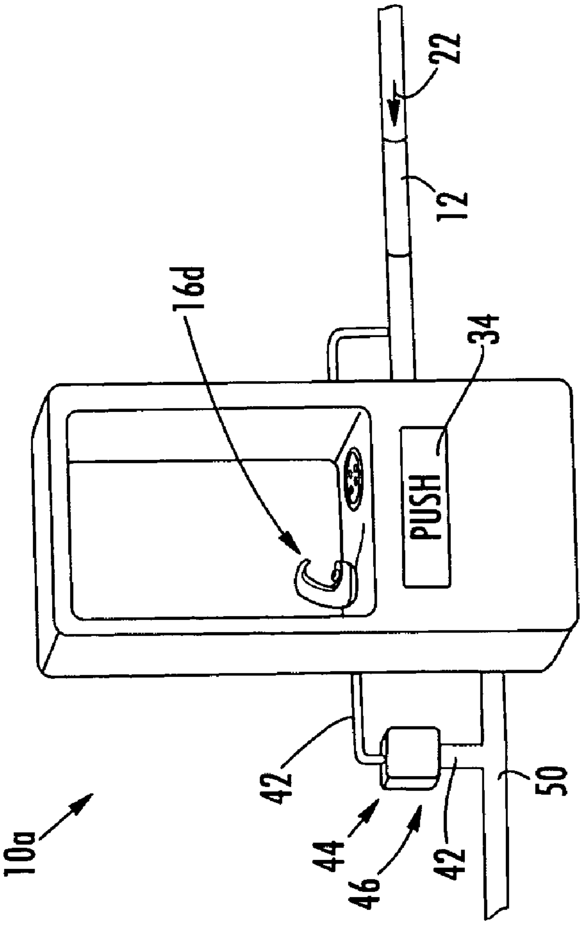
FIG. 6A shows a front isometric view of a drinking fountain having a flushing system in accordance with embodiments of the invention.

As noted earlier, the flow controlled passage 12 can have an outlet 24 adapted for fluid connection to a water dispenser 16. The water dispenser 16 can be any of a number of devices for dispensing water from the flow controlled passage 12. Specific examples of water dispensers can include a shower head 16*a* for an emergency shower (FIG. 2), an eye wash or face wash station 16*b* (FIG. 3), a spigot 16*c* for a sink or tub (FIG. 5), and a drinking fountain spout 16*d* (FIGS. 6A–6B). Each of the water dispensers shown in FIGS. 2–7 are merely provided as examples and embodiments of the invention are not limited to the specific water dispensers shown. It will be understood that each of the above-mentioned water dispensers 16*a*, 16*b*, 16*c*, 16*d* is intended to embrace a wide-variety of such dispensers known in the art. Additional water dispensers 16 can include outdoor hose bibs, shower heads for an indoor or outdoor showers, and bidets. Again, the foregoing examples represent a non-exhaustive list of devices that can dispense water, as will be appreciated by one skilled in the art.

Pressurized water 22 that is received in the flow controlled passage 12 can encounter a flow control valve 14. The flow control valve 14 can be disposed anywhere along the flow controlled passage 12. In some instances, it is preferred if the flow control valve 14 is located as close to the water dispenser 16 as possible, but other considerations such as space constraints may not allow such proximity.

The flow control valve 14 can selectively permit and prohibit the flow of pressurized water through the flow controlled passage 12 and into the water dispenser 16. In some instances, there may be several valves provided along the flow controlled passage 12, but it will be understood that the flow control valve 14 is the valve that is actuated by a user to operate the water dispensing system 10. To that end, a handle or other user interface can be operatively associated with the valve 14 to facilitate user manipulation of the valve 14. In the context of a drinking fountain system 10*a*, the valve 14 can be controlled by pressing or pushing on a user button 34. In a safety shower system 10*b*, the valve 14 can be actuated by providing a pull cord 36. An emergency eyewash system 10*c* can provide a push plate 38 to open the valve 14. In a sink system 10*d*, handles 40 can be provided to control water flow through the spigot 30. Thus, for purposes herein, the flow control valve 14 can be considered the primary valve in the system. The flow control valve 14 may be also be referred to herein as the dispenser valve 14. The flow control valve 14 can be any type of valve, such as a ball valve.

As mentioned earlier, during prolonged periods in which the flow control valve 14 is closed, bacteria and other undesired substances can form, collect and grow in the stagnant water in the flow controlled passage 12 upstream of the flow control valve 14. Occasional flushing of the water in the flow controlled passage 12 can reduce the opportunity for concentrations of the undesired substances to develop. To that end, an automatic water flushing system according to aspects of the invention can be associated with any of the above described the water dispensing systems 10 (including 10*a*, 10*b*, 10*c* and 10*d*).

A flushing system according to embodiments of the invention can include a discharge passage 42 branching off of the flow controlled passage 12. The discharge passage 42 can be provided anywhere along the flow controlled passage 12 upstream of the dispenser valve 14. Preferably, the discharge passage 42 is provided as close to the dispenser valve 14 as possible. In one embodiment, the discharge passage 42 can be adjacently upstream of the dispenser valve 14. The discharge passage 42 can be provided by tapping into the flow controlled passage 12. For example, a hole can be drilled and a fitting such as a nipple can be inserted to facilitate connection to the discharge passage 42. Alternatively, a t-fitting can be placed in the line to which the discharge passage 42 can connect.

The actual hardware making up the discharge passage 42 can be, for example, piping, tubing or hoses. The discharge passage 42 can be made of any suitable material including, for example, brass, stainless steels, plastics or rubber. The discharge passage 42 can be made of a rigid or a flexible material. The discharge passage 42 can be substantially straight or include one or more bends, curves or redirects. Further, the discharge passage 42 can be made of a single component or it can be made of multiple components including additional pipe segments and fittings such as elbows, tees, etc. Embodiments of the discharge passage 42 according to the invention are not limited to any specific cross-sectional shape or area. The cross-sectional shape and/or area of the discharge passage 42 can be substantially constant, or they can vary along the discharge passage 42.

A flow control valve 44 can be provided along the discharge passage 42; this flow control valve 44 will be referred to herein as the discharge valve 44. The discharge valve 44 can selectively permit and prohibit the flow of pressurized water 22 through and out of the discharge passage 42. The discharge valve 44 can be any type of valve, such as a diaphragm valve. In one embodiment, the discharge valve 44 can be pressure sensitive.

A programmable controller 46 can be operatively associated with the discharge valve 44 to control the flow of pressurized water 22 through the discharge passage 42 by automatically activating and deactivating the discharge valve 44. In one embodiment, the controller 46 can be integrated with the discharge valve 44. The controller 46 can be directly connected to the discharge valve 44 or it can be indirectly connected, such as by one or more fittings. The controller 46 can include programmable control circuitry and can also include a programmable microprocessor system for storing instructions for activating and deactivating the discharge valve 44. The programmable controller 46 can be a solenoid controller. In one embodiment, the controller 46 can include a movable plunger (not shown) that operatively engages a diaphragm (not shown) in the discharge valve 44. The diaphragm can be sensitive to pressure variations. The plunger can operatively engage the diaphragm such that the discharge valve 44 remains closed, and the plunger can operatively disengage the diaphragm, thereby allowing the discharge valve 44 to open.

Preferably, the controller 46 can be powered by a power supply such as a replaceable self-contained power source like a 9-volt battery. Other power sources are possible as will be understood by one skilled in the art. Ideally, the power source would have a minimum operating life of about 8 months to 12 months under normal operating conditions.

The controller 46 can store instructions from a hand-held detachable programmer. Alternatively, the controller 46 can include a integral keypad or other user interface. The programmer can transmit instructions to the controller in numerous ways. In one embodiment, a programming/data retrieval port, such as a standard telephone handset jack, can be provided on the controller 46. The port and the controller 46 can be separate and, in such, a cord can be provided to operatively connect them together.

The port can be adapted for receiving instructions from a remote hand-held programming device. For instance, the hand-held programming device can comprise a lap-top computer. The hand-held electronic device can communicate programming instructions to the programmable controller 46 in various manners. The port can provide for either uni-directional or bi-directional communication between the programming device and the controller 46.

Figure 2:
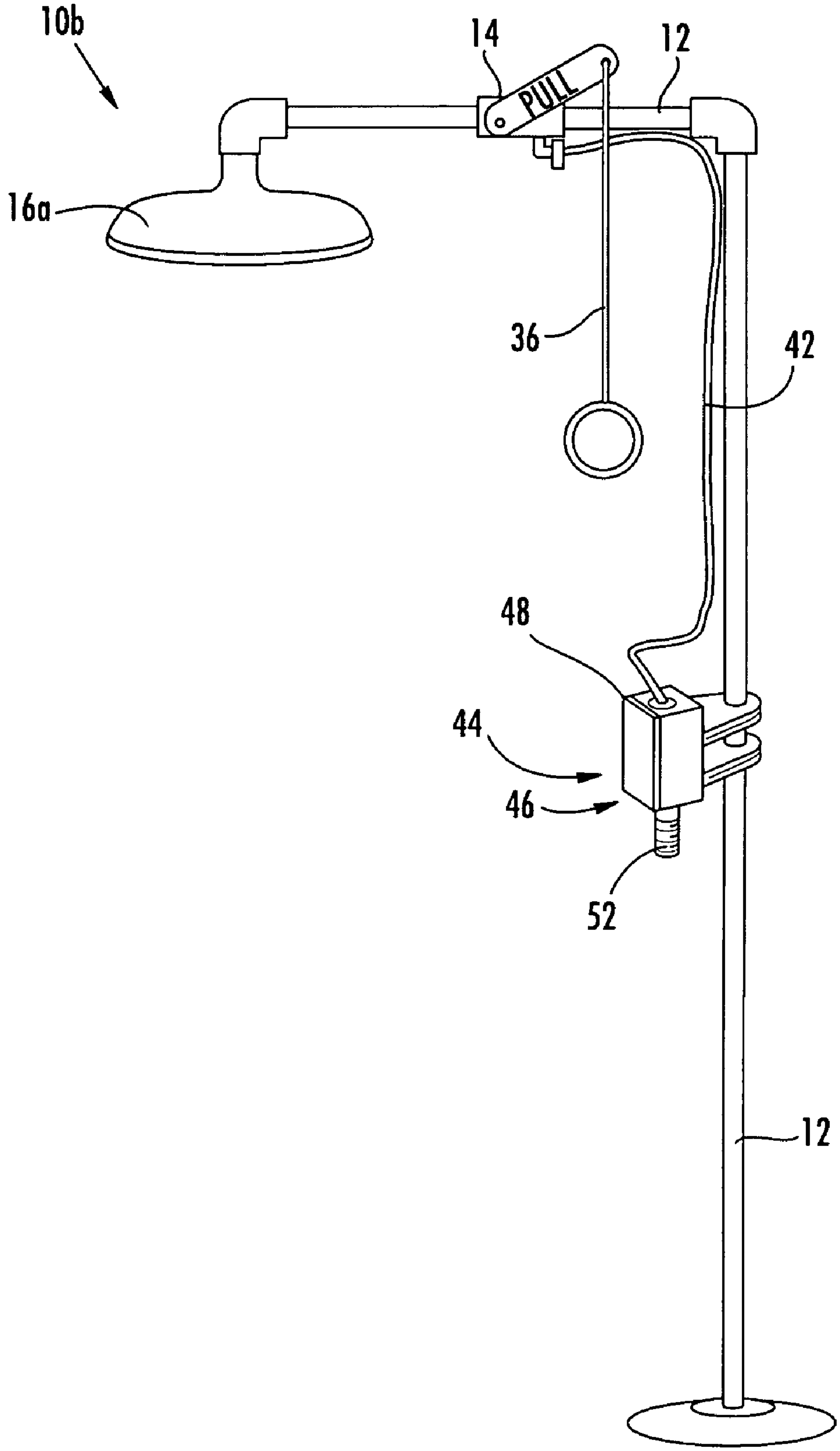
FIG. 2 shows a safety shower having a flushing system in accordance with embodiments of the invention.
Figure 3:
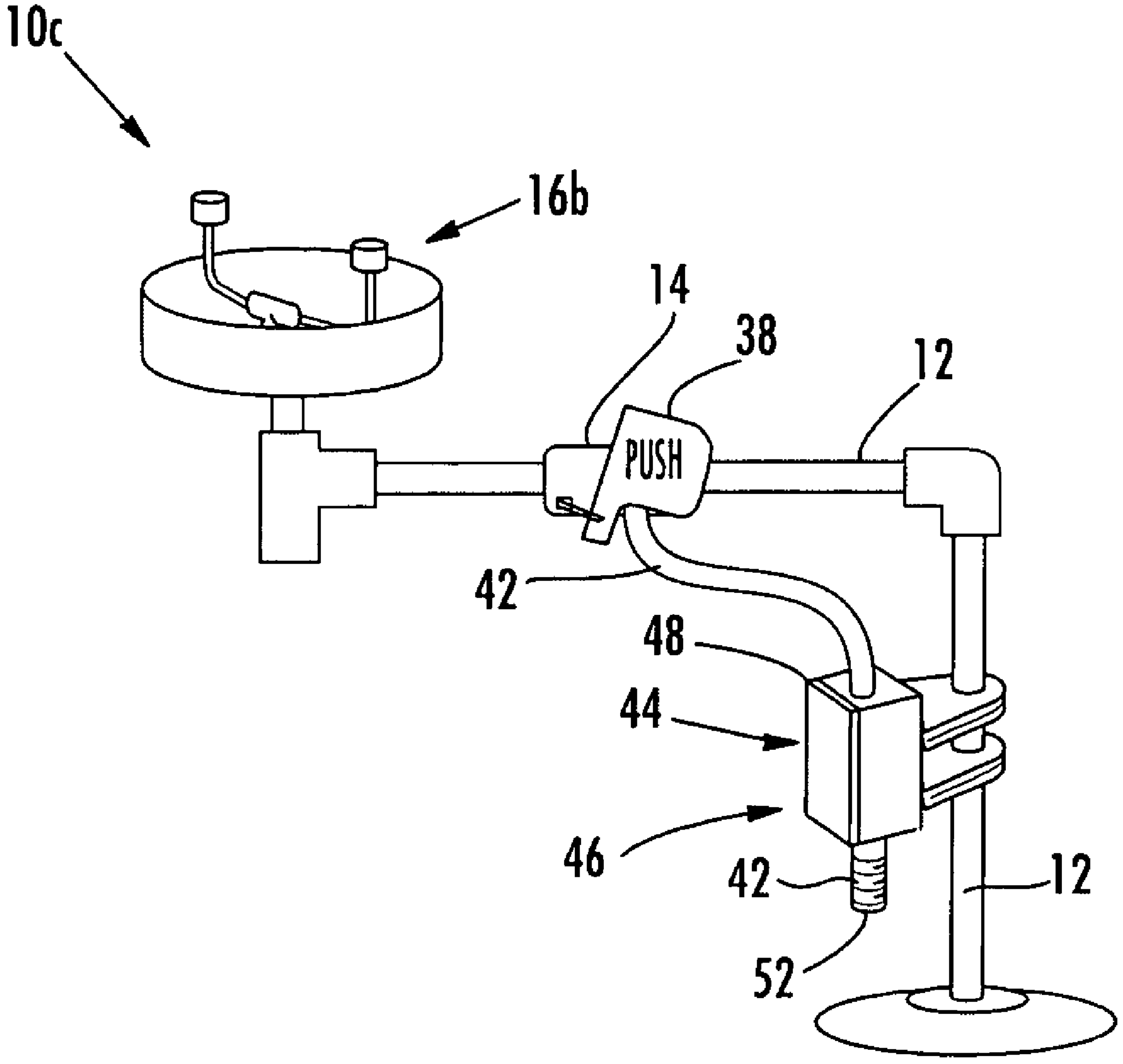
FIG. 3 shows an emergency eyewash having a flushing system in accordance with embodiments of the invention.

In one embodiment, the discharge valve 44 and/or controller 46 can be mounted on the flow controlled passage 12 using fasteners, adhesives, or other securement devices, as shown, for example, in FIG. 2. Alternatively, the discharge valve 44 and/or controller 46 can be mounted on a nearby wall. Further, the discharge valve 44 and/or controller can be at least partially enclosed within a housing 48.

In one embodiment, the controller 46 can be programmed for time-based operation. Thus, the controller 46 can be programmed to activate the flow control valve in various settings or cycles. For example, the controller 46 can be set for a specific day, at a desired time of day and/or for a specified duration of time. The time-based operation can be according to a regular or irregular intervals, or it can even be randomized.

Again, the discharge valve 44 can open when activated by the controller 46. When the discharge valve 44 is open, water can be purged from the discharge passage 42 and the flow controlled passage 12. The purging can continue until the discharge valve 44 is deactivated by the controller 46. The discharged water can be replaced with relatively clean water from the pressurized water distribution system 20. As a result of such flushing, it will be appreciated that the opportunity for undesired substances to grow and concentrate in the flow controlled passage 12 is reduced, minimizing the likelihood that a user of the water dispenser 16 will be exposed or consume unhealthy water. Clean water is especially important when the water is being consumed by the user (drinking fountain or sink) or contacts some portion of the user (eye wash, shower, sink).

The pressurized water purged from the flow controlled passage 12 according to embodiments of the invention can be directed to a drain system 50. The drain system 50 can be a floor drain, a sink, or a drain pipe, just to name a few examples. The discharge passage 42 can be in fluid communication with the drain system 50. In one embodiment, the discharge passage 42 can have an outlet 52 that directly connects to the drain system 50. In such case, a backflow prevention device can be placed along the discharge passage downstream of the discharge valve so as to prevent the backflow of contaminated water. In another embodiment, the outlet 52 of the discharge passage 42 can be spaced from the drain system 50. In one embodiment, the outlet 52 of the discharge passage 42 can be directed to the ground or to the floor. Thus, discharged water can be subsequently cleaned with a mop, or, if outdoors, the discharged water can be absorbed into the soil.

Figure 4:
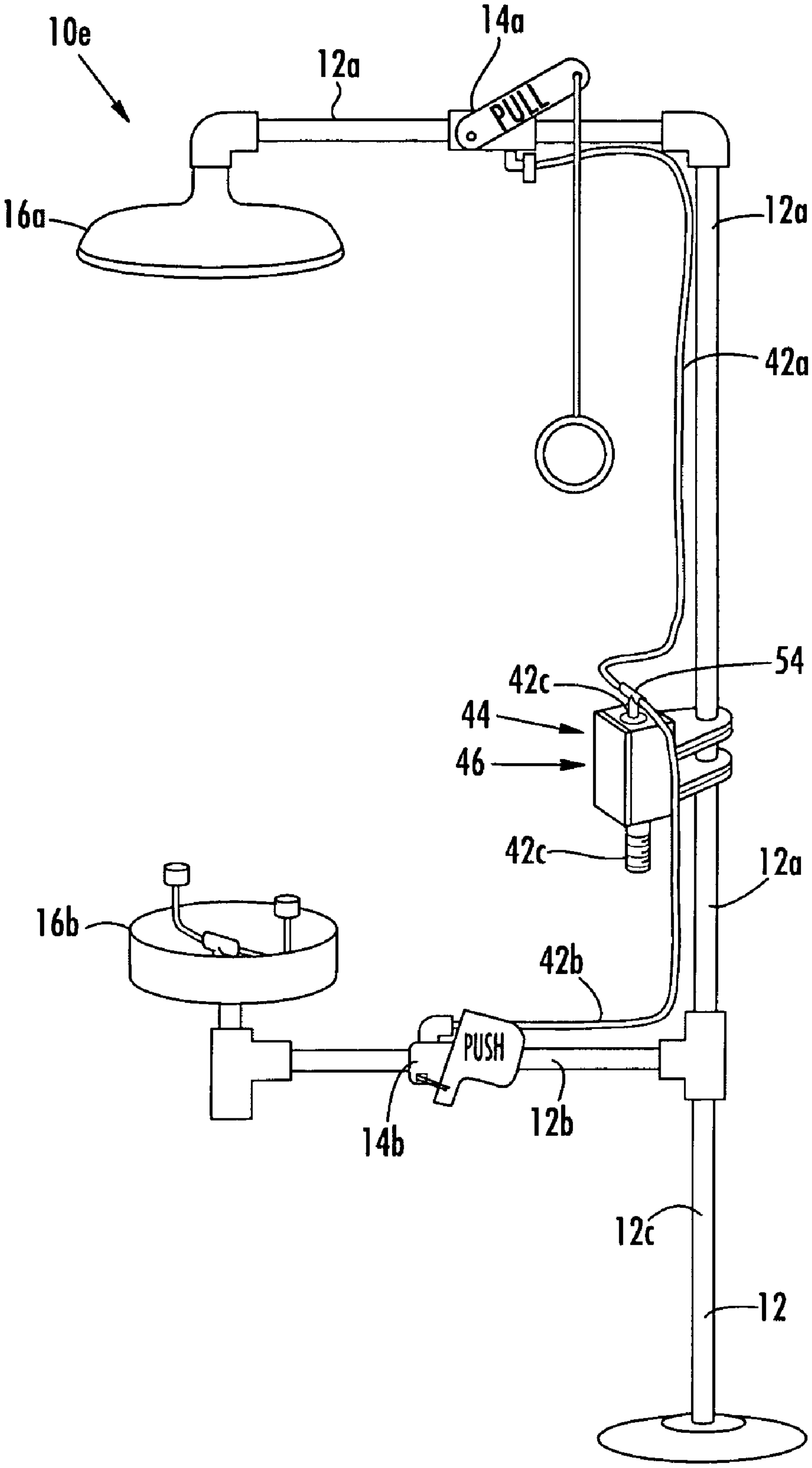
FIG. 4 shows a combined safety shower and emergency eyewash having a flushing system in accordance with embodiments of the invention.
Figure 5:
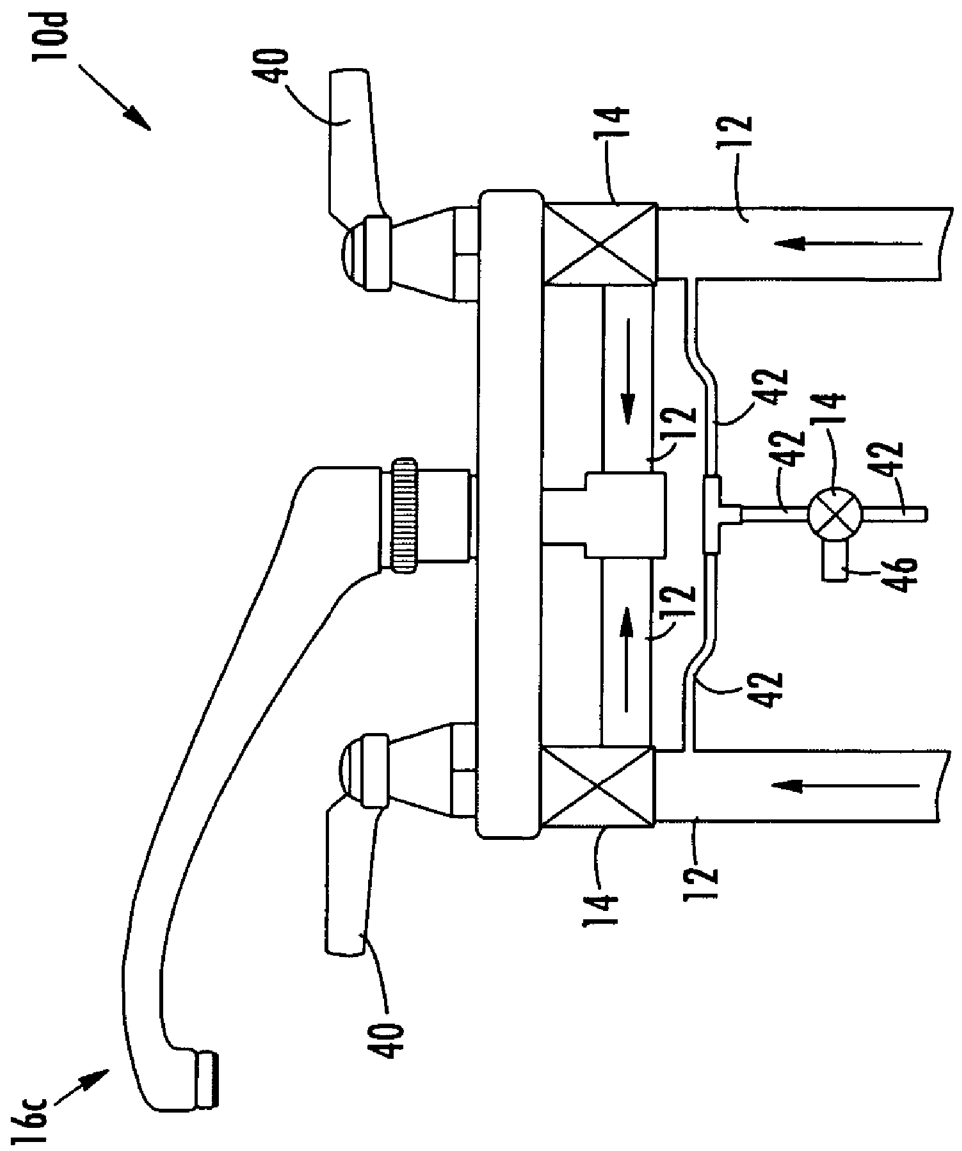
FIG. 5 shows a sink having a flushing system in accordance with embodiments of the invention.

It should be noted that any of the above systems can be combined. For example, as shown in FIG. 4, an emergency eye wash and safety shower can be provided as a combined system 10*e*, as is known in the art. In such case, a portion of the flow controlled passage 12 associated with each water dispenser can be common and a portion can be unique. For example, segment 12*c* of the flow controlled passage is commonly shared between the shower head and the eye wash station. However, segment 12*b* can be dedicated to the eyewash station 16*b*, and segment 12*a* can be dedicated to the shower head 16*a*.

In this case, there can be two discharge passages. A first discharge passage 42*a* can be provided upstream of the shower head valve 14*a*; a second discharge passage 42*b* can be provided upstream to the eyewash valve 14*b*. The previous discussion of the discharge passage 42 is equally applicable to the first and second discharge passages 42*a*, 42*b*. In one embodiment, the first and second discharge passages 42*a*, 42*b* can be joined to form a common discharge passage 42*c*. A t-fitting 54, for example, can be used to join the first and second discharge passages 42*a*, 42*b* to form a common discharge passage 42*c* exiting therefrom. The discharge valve 44 can be provided along this common passage 42*c*. Alternatively, each of the discharge passages 42*a*, 42*b* can have a dedicated discharge valve 44 associated with it. In such case, the discharge passages 42*a*, 42*b* can remain separate. Other ways, locations and configurations for joining the discharge passages 42*a*, 42*b* are possible as will be appreciated by one skilled in the art.

Figure 7:
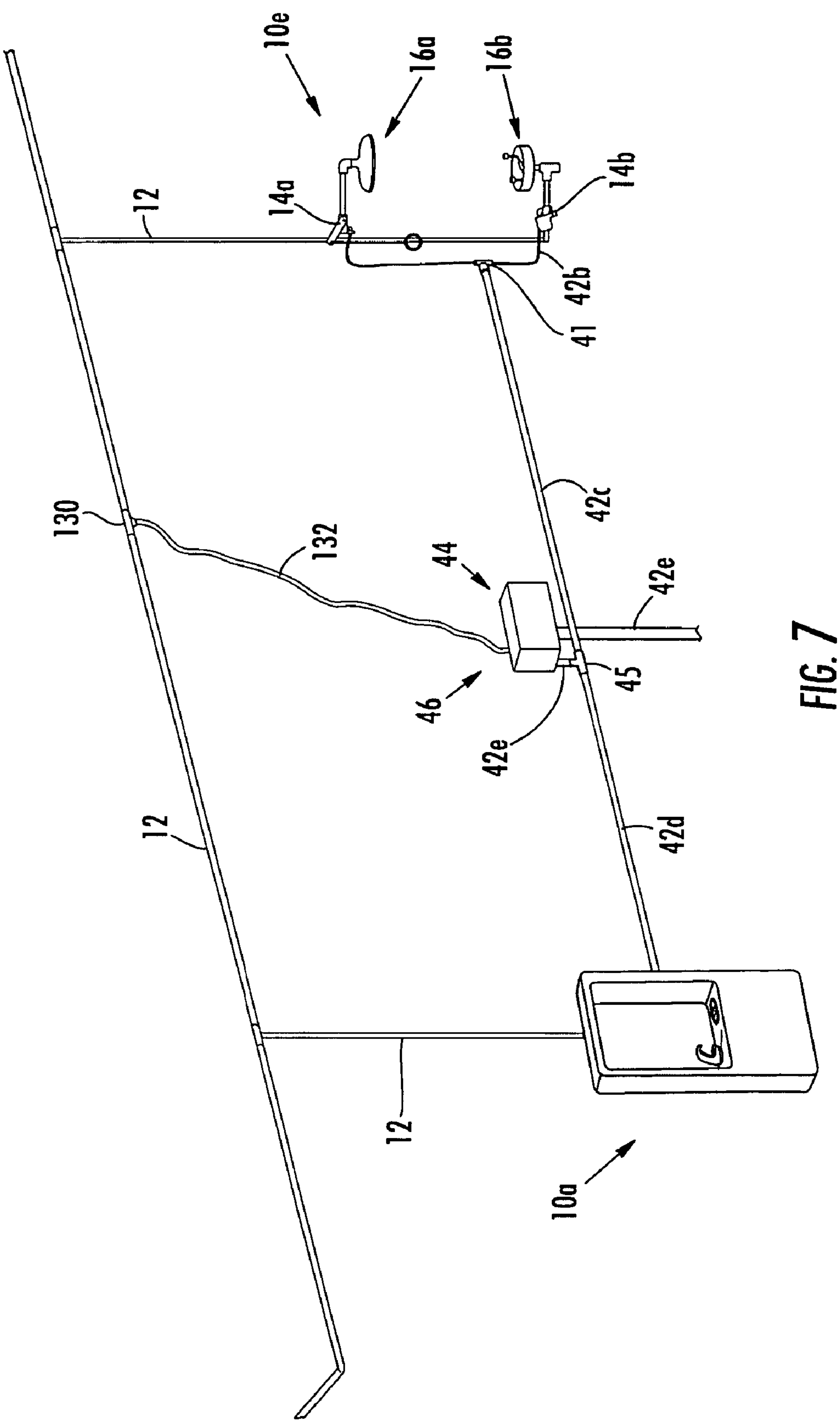
FIG. 7 shows a water delivery system having a flushing system in accordance with embodiments of the invention in which the water delivery system supplies water to a drinking fountain and a combined safety shower and emergency eyewash.

Another example of a combined water dispensing system is shown in FIG. 7 in which a flushing system can be provided for a safety shower/emergency eyewash unit 10*e* in combination with another water dispenser, such as a drinking fountain 10*a*. In such case, the first and second discharge passages 42*a*, 42*b* from the eyewash/shower unit 10*e* can be joined, such as by a t-fitting 41, to form a common discharge passage 42*c*, as explained above. A discharge passage 42*d* can extend from the drinking fountain 10*a*. The drinking fountain discharge passage 42*d* and the common discharge passage 42*c* can the be combined by a fitting, such as a t-fitting 45, to form a single discharge passage 42*e*. A discharge valve 44 can be provided along the single discharge passage 42*e*. Other manners of and locations for joining the various discharge passages will be appreciated by one skilled in the art.

Any of the above described time-based systems can also include temperature-based flushing aspects as well. Such systems may be desired when any portion of the flow controlled passage 12 or discharge passage 42 is exposed to temperature extremes. For example, in colder climates, the water in the flow controlled passage 12 or discharge passage 42 can freeze, causing damage to the system or possibly rendering the system inoperable. In addition, a portion of the flow controlled passage 12 or discharge passage 42 can be in a heated environment, such as a hot industrial plant, an above-ground outdoor exposure or when portions of the flow controlled passage 12 are located overhead, as shown in FIG. 7. In such cases, water in the passages can be heated to unacceptably high levels for human use and consumption, raising concerns of scalding or discomfort, among other things. Also, heated water in the passages can diminish the palatability of the water.

Figure 8:
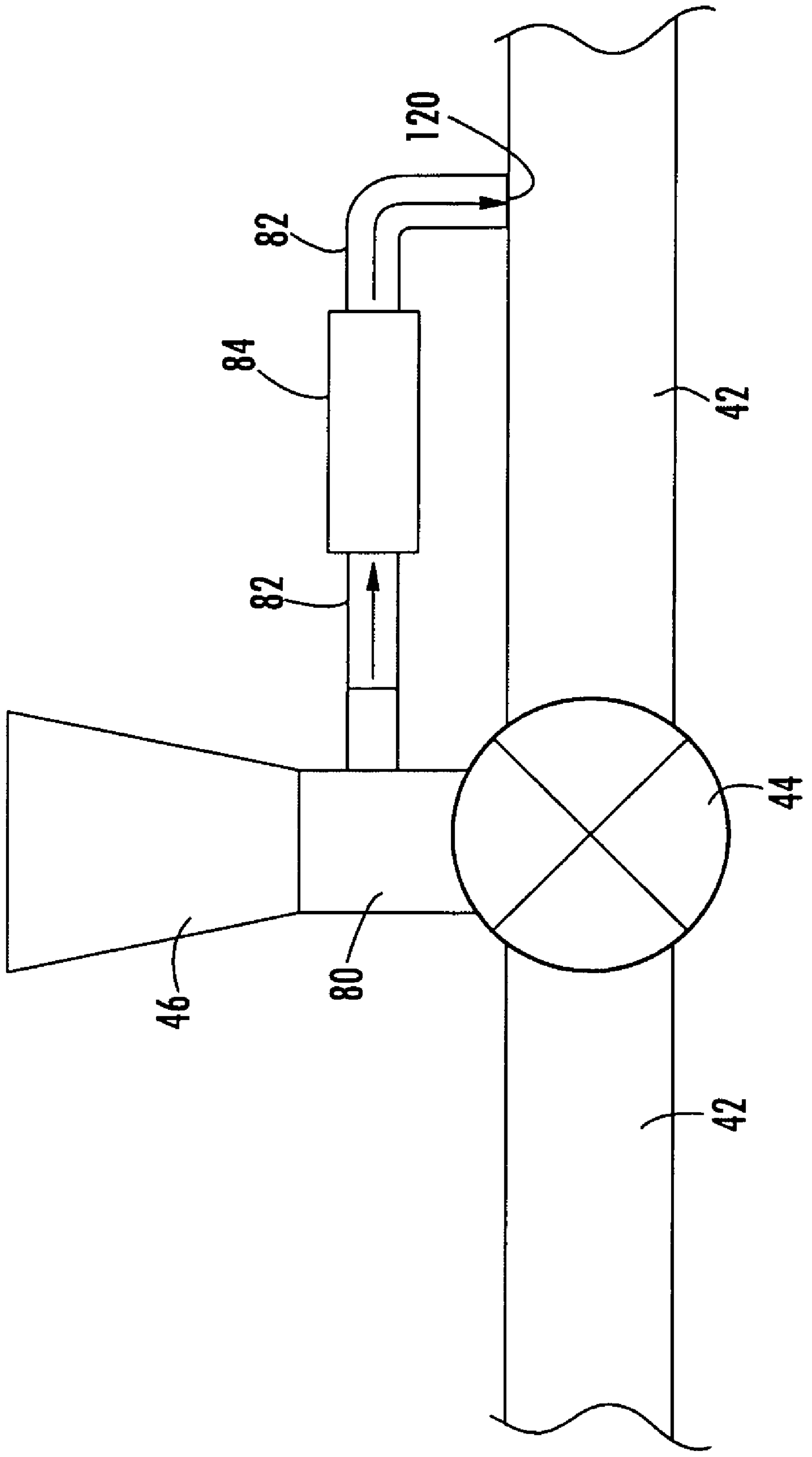
FIG. 8 is a partial diagrammatic view of a temperature based flushing subsystem with local temperature sensing according to embodiments of the invention.
Figure 9:
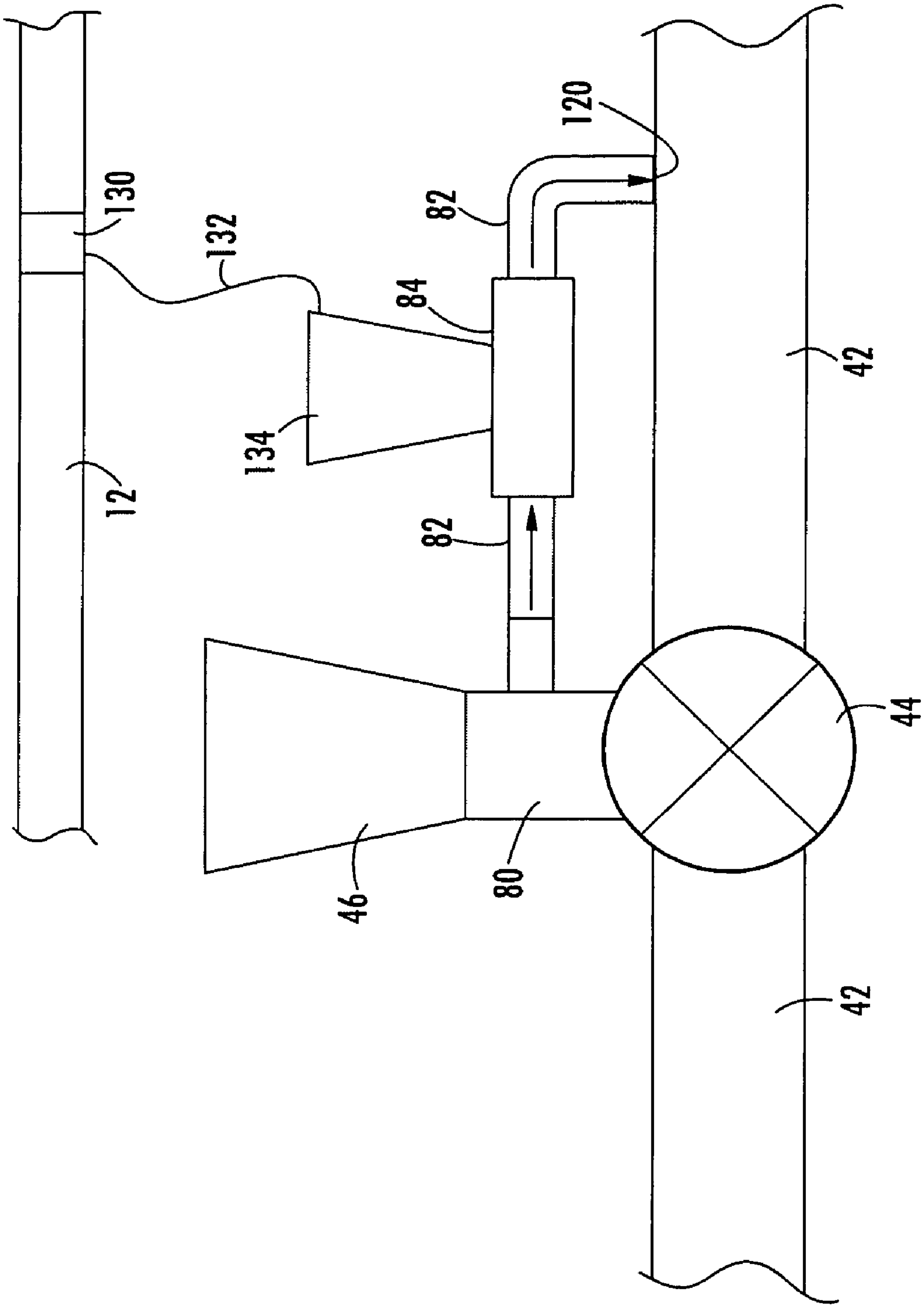
FIG. 9 is a partial diagrammatic view of a temperature based flushing subsystem with remote temperature sensing according to embodiments of the invention.
Figure 10:
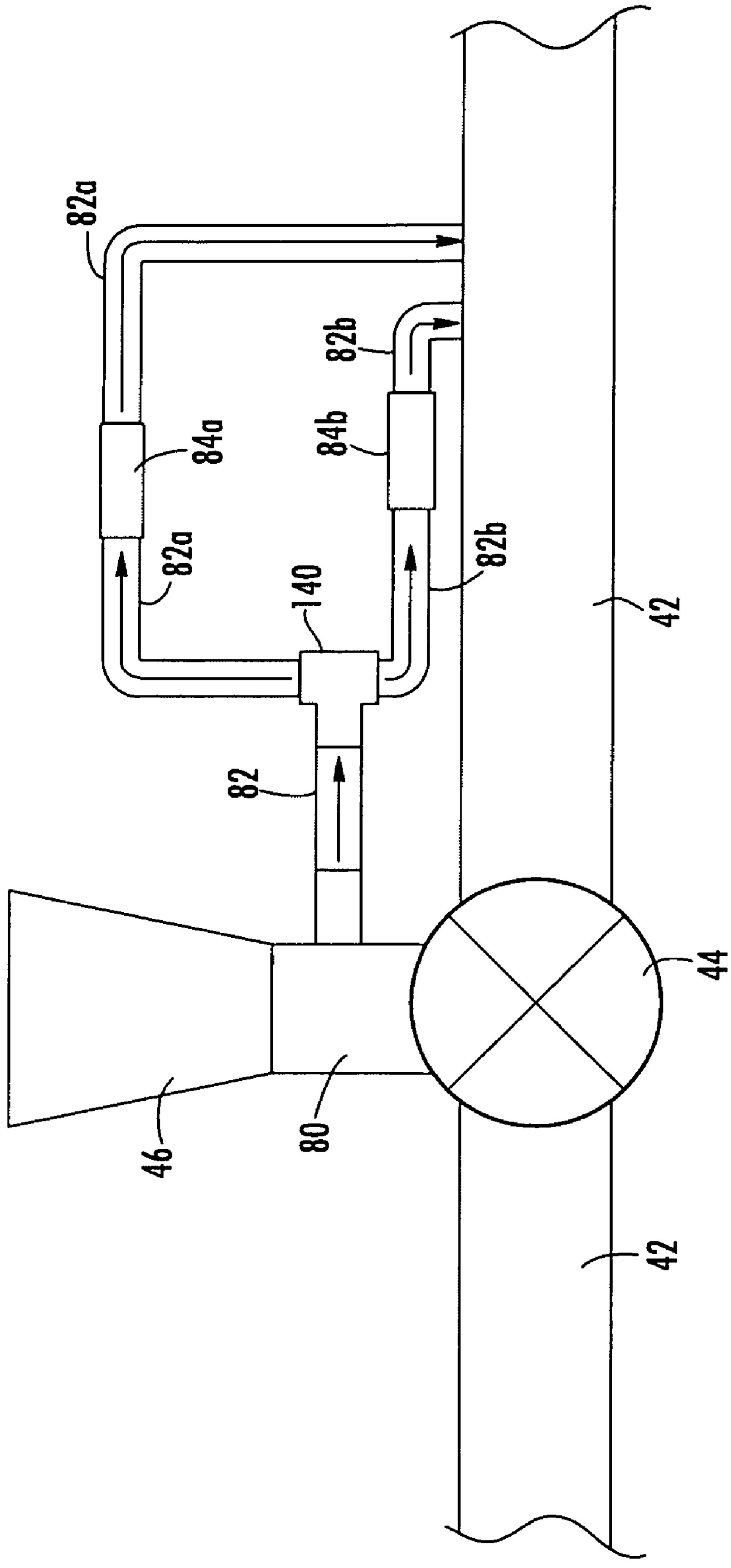
FIG. 10 is a partial diagrammatic view of another temperature based flushing subsystem according to embodiments of the invention.

FIGS. 8–10 show several examples of temperature based systems according to embodiments of the invention which can minimize such concerns. Turning to FIG. 8, a t-fitting 80 can be inserted between the controller 46 and the discharge valve 44. A temperature discharge passage 82 can branch off from one end of the t-fitting 80. It should be noted that the term temperature discharge passage is intended to facilitate discussion by distinguishing from the other passages referenced herein, and the phrase "temperature discharge" is not intended to be limiting. The previous discussion of the flow controlled passage 12 and/or discharge passage 42 apply equally to the temperature discharge passage 82. In one embodiment, the temperature discharge passage 82 can be formed by flexible tubing. A temperature control valve 84 can be provided along the temperature discharge passage 82.

Figure 12:
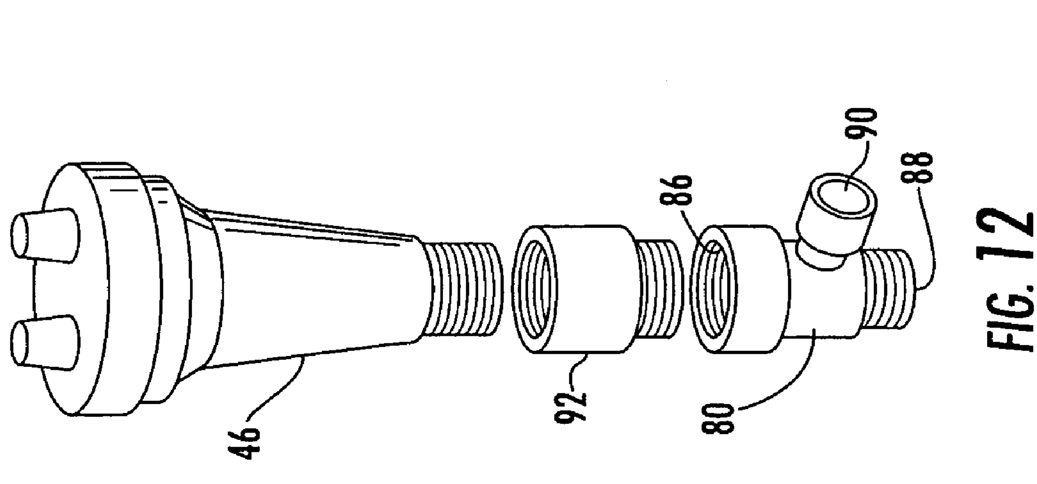
FIG. 12 is an exploded isometric view of a controller and t-fitting according to embodiments of the invention.

The t-fitting 80, among other things, can facilitate the opening of the discharge valve 44 for timed flushing and thermal protection purposes. An example of a t-fitting 80 that can have certain features according to aspects of the present invention is shown in FIGS. 12–15. The t-fitting can have a first end 86, a second end 88 and a third end 90. The first end 86 can be connected directly to the controller 46 such as by threaded engagement. However, the connection may be indirect as well. For example, as shown in FIG. 12, an adapter 92 can be disposed between the controller 46 and the first end 86 of the t-fitting 80 for providing adaptability between the controller 46 and other components, if needed. Similarly, the second end 88 can connect, either directly or indirectly, into the discharge valve 44. The third end 90 can connect to the temperature discharge passage 82 such as by hose clamps, fitting or a swage-type connection. Each of these ends 86,88,90 can have any of a number of configurations such as internal or external threads. Further, the configuration of the ends 86,88,90 can be identical or they can be completely different from each other. The t-fitting 80 can be made of any material such as metals or plastics.

The t-fitting 80 can have numerous internal features according to aspects of the present invention. For example, the t-fitting 80 can include three passages 94,96,98 that are generally defined by the inner diameter of the t-fitting 80 and three dividing walls 100,102,104 extending from a central hub 106. Extending through the central hub 106 is a passage 108. At the second end 88 of the t-fitting 80, each of passages 94,96 can include an opening 110,112, respectively. The above described features can cooperate to open and close the discharge valve 44.

Openings 110,112 provide a path for water at the discharge valve 44 to initially enter the t-fitting 80. However, any further flow is generally cut off by the discharge valve 44 and the temperature control valve 84. Further, in one embodiment, the upper opening 108*a* of the passage 108 can be closed or sealed by a nipple and/or plunger (not shown) associated with the controller 46. In short, the water in and around the t-fitting 80 is generally under pressure, and the arrangement of the internal features of the t-fitting 80 can assist in the opening and closing of the discharge valve 44.

For example, during a normal flushing operation, the controller 46 can activate the discharge valve 44 by retracting the plunger/nipple so that it lifts off of the upper opening 108*a*. As a result, the pressurized water in the t-fitting 80 will flow into passage 108. This creates a loss of pressure in that region. In one embodiment, the discharge valve 44 can include diaphragm (not shown) that can be sensitive to pressure shifts. Thus, the loss of pressure created when the plunger/nipple is lifted off of the upper opening 108*a* can cause the discharge valve 44 to open, and pressurized water is flushed from the system. In addition, water that flows into the passage 108 can flow out into the control valve 44 on the other side of the diaphragm. To end the flushing cycle, the controller 46 can push the plunger and/or nipple over the upper opening 108*a* of passage 108. Again, this is merely an example of one way in which the controller 46 can operate the discharge valve 44 through a fitting.

Not only can the controller 46 operate the discharge valve 44, but the temperature control valve 84 can operate the discharge valve 44 as well, separately and independently from the controller 46. As will be described below, the temperature control valve 84 can create a pressure relief when it opens so as to cause the discharge valve 44 to open. Starting in a non-flushing mode, the temperature discharge passage 82 upstream of the temperature control valve 84 is filled with water. Water is allowed to enter the temperature discharge passage 82 through passage 98 in the t-fitting 80. Thus, a portion of the water in the temperature discharge passage 82 is substantially proximate to the temperature control valve 84. When the water in the temperature discharge passage 82 reaches a predetermined temperature, the temperature control valve 84 can open, relieving the pressure in the temperature discharge passage 82 so as to allow water to flow through the temperature control valve 84 and out through the temperature discharge passage 82. The outlet 120 of the temperature discharge passage 82 may or may not connect back into the discharge passage 42. The pressure loss causes more water to be delivered to the temperature discharge passage 82 through the t-fitting 80. As a result, the discharge valve 44 will open and the system will begin a flush cycle. The above is merely one example of t-fitting 80; there are a variety of t-fittings and other type fittings or other fitting within the scope of the invention.

The temperature control valve 84 can be any device designed to open, fully or partially, at various temperature levels. In one embodiment, the temperature control valve 84 can fully open at a predetermined temperature. In another embodiment, the temperature control valve 84 can begin to open at a first temperature. If the temperature of the water continues to fall or rise, depending on the application, the valve 84 can gradually and commensurately open until it fully opens at a second temperature. The settings of the temperature control valve 84 may or may not be adjustable depending on the particular temperature control valve 84.

For applications in which freezing water is a concern, the temperature control valve 84 can begin to open at, for example, about 40 degrees Fahrenheit. If the temperature continues to drop, the temperature control valve 84 can continue to open until it is fully open at about 35 degrees Fahrenheit. Alternatively, the temperature control valve 84 can start to open at about 35 degrees Fahrenheit and become fully open at about 30 degrees Fahrenheit. In applications where hot water is a concern, the temperature control valve

84 can begin to open at about 115 degrees Fahrenheit. If the temperature continues to rise, the valve 84 can gradually and commensurately open until it fully opens at about 120 degrees Fahrenheit. Again, the above temperature ranges are provided as examples, and embodiments of the invention are not limited to any particular range.

The temperature control valve 84 can be configured to respond to or measure the water temperature in the temperature discharge passage 82 upstream of the valve 84. Accordingly, the temperature control valve 84 can include, for example, a thermometer or a temperature sensitive metal coil. In one embodiment, the temperature control valve 84 can be a purely mechanical device. In another embodiment, the temperature control valve 84 can be electronic or have electronic attributes.

The previous described system is suitable for responding to the water temperature in the temperature discharge passage 84 proximate the temperature control valve 84. However, in some circumstances, it may be desired to have the temperature control valve 84 respond to the temperature of the water in another location. For instance, in a chemical plant, at least a portion of the flow controlled passage 12 may be exposed to a hot environment such as being located outdoors or in overhead rafters, such as shown in FIG. 7. While the water in the temperature discharge passage 82 may be at an acceptable temperature, the temperature of the water in the flow controlled passage 12 or other portion of the discharge passage 42 may be unacceptably high. If the dispenser valve 14 is opened by a user, the temperature of the water initially exiting the water dispenser 16 may be acceptable, but the hot water from the flow controlled passage 12 may exit through the water dispenser 16 and scald or otherwise harm or cause discomfort to the user.

To minimize such concerns, a temperature sensor 130 can be located along the flow controlled passage 12 or any other desired location, as shown in FIG. 9. The temperature sensor 130 can be, for example, a thermocouple or a thermostat having a circuit that is completed when the temperature reaches a certain predetermined level. The temperature sensor 130 can generate a signal that can be sent, such as along a wire 132 or by telemetry, to an electronic controller 134 operatively associated with the temperature control valve 84. The previous discussion of the controller 46 in connection with the discharge valve 44 applies equally to the controller 134 in connection with the temperature control valve 84. When it receives the signal from the remote sensor 130, the controller 134 can activate the temperature control valve 84 so as to flush the water from the system through the temperature discharge passage 82. The temperature discharge passage 82 can have an outlet 120 adapted for connection back into the discharge passage 42 downstream of the discharge valve 44. Alternatively, the temperature discharge passage 82 may not tap back in to the discharge passage 42.

The opening of the temperature control valve 84 can cause a pressure relief, which, in turn, can cause the pressure sensitive discharge valve 44 to open, thereby providing additional flushing capacity. In this instance, the discharge valve 44 opens independently of the time-based flushing of the controller 46. The flushing can continue until the temperature sensed by the sensor 130 falls below the predetermined level. In response, the controller 134 can close the temperature control valve 84 and repressurize the system upstream thereof. As a result, the discharge valve 44 can close under the force of the increased pressure. While the system shown in FIG. 9 is especially suited for purging excessively hot water from the flow controlled passage 12 or other passage, it can also be configured to flush water at excessively cold temperatures as well.

Figure 11:
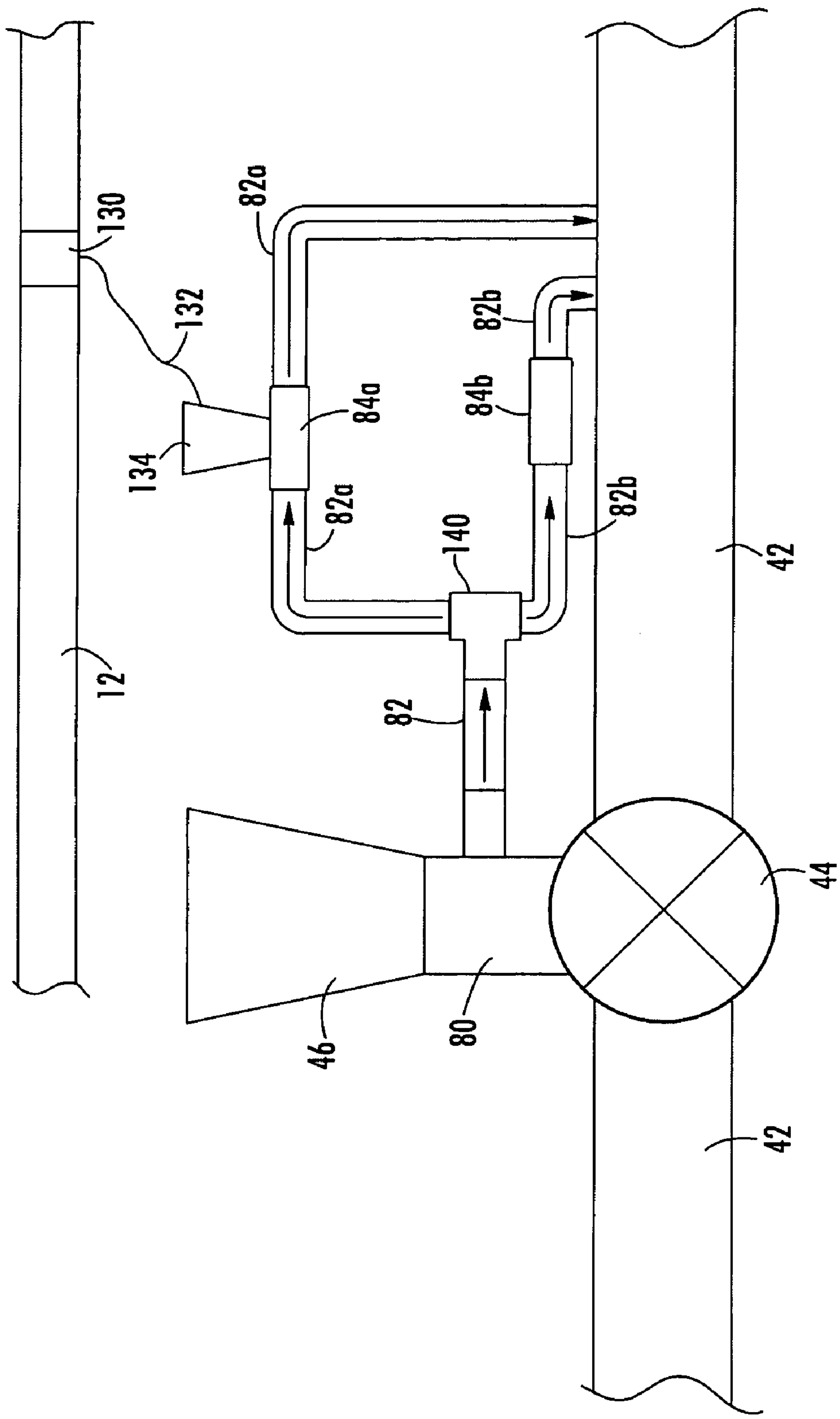
FIG. 11 is a partial diagrammatic view of another temperature based flushing subsystem according to embodiments of the invention.
Figure 13:
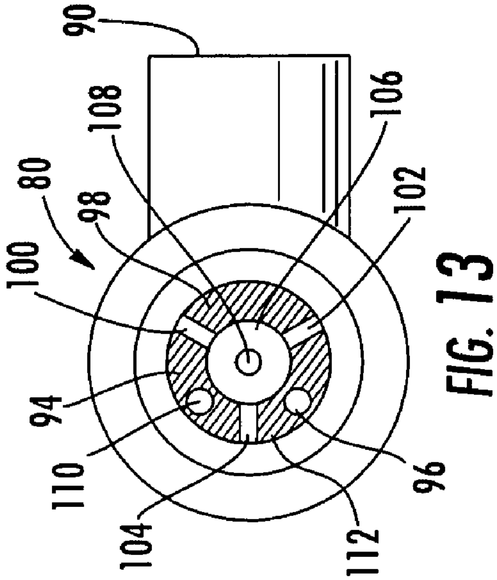
FIG. 13 is a top plan view of a t-fitting according to embodiments of the invention.
Figure 14:
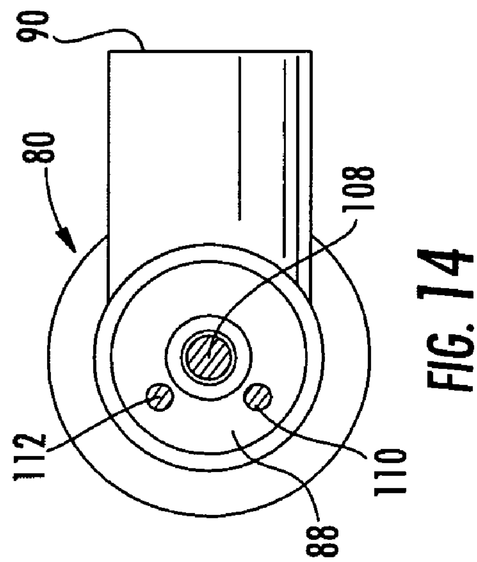
FIG. 14 is a bottom plan view of a t-fitting according to embodiments of the invention.
Figure 15:
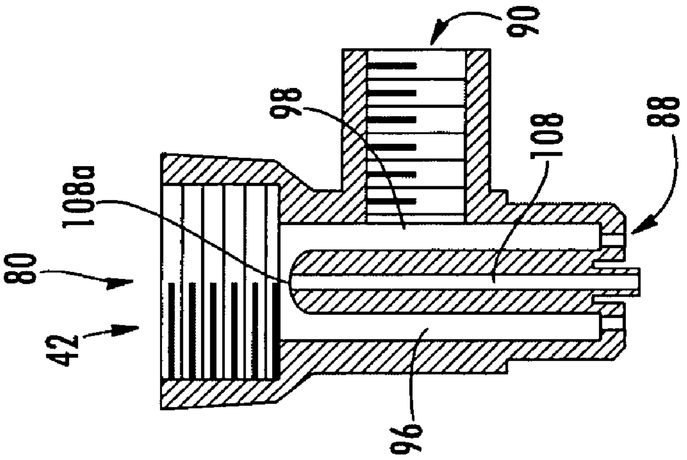
FIG. 15 is a cross-sectional view of a t-fitting according to embodiments of the invention.

As shown in FIGS. 10–11, another system according to embodiments of the invention can afford both protection against water at hot and cold extremes. In such case, a t-fitting 80 can be provided between the discharge valve 44 and the controller 42, as discussed above. A passage 82 can extend from the t-fitting 80 and route to a second t-fitting 140, which can be a standard t-fitting as opposed to a specially configured t-fitting like the one shown in FIGS. 12–15. A first temperature discharge passage **82*a* can branch from one end of the second t-fitting 140. A first temperature control valve 84*a* can be provided along the first temperature discharge passage 82*a*. In one embodiment, shown in FIG. 10, the first temperature control valve 84*a* can be responsive to the water in the first temperature discharge passage 82*a*. The details of such an arrangement has been discussed above in connection with FIG. 8. Alternatively, as shown in FIG. 11, the first temperature control valve 84*a* can be operatively associated with a controller 134. The controller 134 can be operatively associated with a temperature sensor 130 disposed along the flow controlled passage 12 or other portion of the system. The details of such an arrangement has already been discussed above in connection with FIG. 10. A second temperature discharge passage 82*b* can extend from the other branch of the t-fitting 140. A second temperature control valve 84*b* can be disposed along the second temperature discharge passage 82*b*. The details of such an arrangement has been discussed above in connection with FIG. 8**.

For purposes of discussing the operation of such a system, it will be assumed that the first temperature control valve **84*a* and the components associated therewith are provided for purposes of protection against excessively hot water. It will also be assumed that the second temperature control valve 84*b* and the components associated therewith are provided for purposes of freeze protection. Naturally, the reverse arrangement could be provided. Under these assumptions, the first temperature control valve 84*a* can be responsive to the temperature of the water in a remote location of, for example, the flow controlled passage 12. In contrast, the second temperature control valve 84*b* can be responsive to the temperature of the water adjacent thereto in the second temperature discharge passage 82*b***.

When one of the temperature control valves **84*a*, 84*b* opens, as discussed previously, pressurized water in the respective discharge passage 82*a*, 82*b* can be flushed from the system. As noted before, the opening of either one of these temperature control valves 84*a*, 84*b* may also cause the discharge valve 44 to open. However, the opening of one of the valves 84*a*, 84*b* will not trigger the opening of the other temperature control valve 84*a*, 84*b*. While unlikely, it may be possible in some circumstances for both valves 84*a*, 84*b* to open at the same time. The first and second temperature discharge passages 82*a*, 82*b* can join each other downstream of their respect discharge valves 84*a*, 84*b*. Alternatively, the temperature discharge passages 82*a*, 82*b* can remain separate. Further, the first and second discharge passages 82*a*, 82*b* may or may not connect back in to the discharge passage downstream of the discharge valve 44**.

The foregoing description is provided in the context of several applications according to embodiments of the invention. Of course, aspects of the invention can be employed with respect to myriad water dispensing systems, including all of those described above, as one skilled in the art would appreciate. Thus, it will of course be understood that the invention is not limited to the specific details described herein, which are given by way of example only, and that various modifications and alterations are possible within the scope of the invention as defined in the following claims.

What is claimed is:

1. A water flushing system comprising:

an eyewash station;

a flow controlled passage having an inlet adapted for fluid connection to a pressurized water distribution system and an outlet adapted for fluid connection to the eyewash station;

an eyewash valve disposed along the flow controlled passage for selectively permitting and prohibiting the flow of pressurized water through the flow controlled passage and into the shower head;

a discharge passage branching from the flow controlled passage upstream of the eyewash valve;

a discharge valve disposed along the discharge passage for selectively permitting and prohibiting the flow of pressurized water through the discharge passage; and a programmable controller for regulating the flow of pressurized water through the discharge passage by activating and deactivating the discharge valve on a predetermined timed basis, whereby stagnant water can be flushed from the flow controlled passage to maintain water quality in the flow controlled passage as delivered to the eyewash station.

2. The system of claim 1 wherein the shower head valve is located proximate to the eyewash station.

3. The system of claim 1 wherein the controller is powered by a battery.

4. The system of claim 1 wherein the discharge passage connects to the flow controlled passage substantially adjacently upstream of the eyewash valve.

5. The system of claim 1 wherein the controller includes electronic control circuitry having a microprocessor system for storing instructions for activating and deactivating the discharge valve, wherein the microprocessor system is operatively connected to a programming interface for inputting electronic information to be stored and processed in the microprocessor system for activating and deactivating the discharge valve.

6. The system of claim 1 wherein the discharge passage has an outlet adapted for fluid communication with a drain system.

7. The system of claim 6 wherein the outlet of the discharge passage is spaced from the drain system.

8. The system of claim 6 wherein the outlet of the discharge passage is directly connected to the drain system.

9. The system of claim 6 wherein the drain system is one of a floor drain, a sink or a drainpipe, or the ground.

10. The system of claim 1 further including:

a temperature discharge passage branching from the discharge passage substantially at the discharge valve; and a temperature control valve provided along the discharge passage for selectively permitting and prohibiting the flow of pressurized water through the temperature discharge passage.

11. The system of claim 10 wherein the temperature control valve is responsive to the temperature of the water in the temperature discharge passage such that when the water temperature reaches a first predetermined temperature, the temperature control valve at least partially opens, whereby pressurized water passes through the temperature discharge passage.

12. The system of claim 11 wherein the predetermined temperature is from about 30 degrees Fahrenheit to about 40 degrees Fahrenheit.

13. The system of claim 11 wherein the predetermined temperature is from about 90 degrees Fahrenheit to about 120 degrees Fahrenheit.

14. The system of claim 10 wherein the temperature discharge passage has an outlet adapted for fluid connection to the discharge passage downstream of the discharge valve.

15. The system of claim 10 further including:

a programmable temperature responsive controller for regulating the flow of pressurized water through the temperature discharge passage by activating and deactivating the temperature control valve;

a temperature sensor disposed along the flow controlled passage, the temperature sensor generating a signal when the water in the flow control passage reaches a predetermined temperature level, wherein the temperature sensor is operatively associated with the temperature responsive controller such that the temperature responsive controller is responsive to signals received from the sensor.

16. The system of claim 15 wherein the temperature sensor is operatively associated with the temperature responsive controller by a sensor wire.

17. The system of claim 15 wherein the temperature responsive controller is programmed wit a predetermined temperature limit such that, when the temperature of the pressurized water in the flow controlled passage reaches the predetermined temperature limit, the temperature responsive controller activates the temperature control valve to permit the flow of pressurized waxer through the temperature discharge passage, whereby the dangers associated with water temperatures beyond the predetermined temperature limit are avoided.

18. The system of claim 17 wherein the predetermined temperature is from about 30 degrees Fahrenheit to about 40 degrees Fahrenheit.

19. The system of claim 17 wherein the predetermined temperature is from about 90 degrees Fahrenheit to about 120 degrees Fahrenheit.

20. The system of claim 10 further including:

a passage branching from the discharge passage at the discharge valve, wherein the supply passage splits into a first temperature discharge passage and a second temperature discharge passage;

a first temperature control valve disposed along the first temperature discharge passage;

a programmable temperature responsive controller for regulating the flow of pressurized water through the first temperature discharge passage by activating and deactivating the temperature control valve;

a temperature sensor disposed along the flow controlled passage, the temperature sensor generating a signal when the water in the flow control passage reaches a predetermined temperature level, wherein the sensor is operatively associated with the temperature responsive controller such that the temperature responsive controller is responsive to signals received from the sensor; and a second temperature control valve disposed along the second temperature discharge passage, wherein the second temperature control valve is responsive to the temperature of the water in the second temperature discharge passage such that when the water in the second temperature discharge passage reaches a predetermined temperature limit, the second temperature control valve opens.

21. The system of claim 20 wherein the first and second temperature discharge passages have outlets adapted for fluid connection to the discharge passage.

22. The system of claim 20 wherein the first and second temperature discharge passages merged downstream of their respective temperature control valves.

23. The system of claim 20 wherein the predetermined temperature limit of the first temperature control valve is from about 90 degrees Fahrenheit to about 120 degrees Fahrenheit.

24. The system of claim 20 wherein the predetermined temperature limit of the second temperature control valve is from about 30 degrees Fahrenheit to about 40 degrees Fahrenheit.

25. The system of claim 10 further including:

a passage branching from the discharge passage at the discharge valve, wherein the supply passage splits into a first temperature discharge passage and a second temperature discharge passage;

a first temperature control valve disposed along the first temperature discharge passage, wherein the first temperature control valve is responsive to the temperature of the waver in the first temperature discharge passage such that when the water in the first temperature discharge passage reaches a predetermined temperature limit, the first temperature control valve opens; and a second temperature control valve disposed along the second temperature discharge passage, wherein the second temperature control valve is responsive to the temperature of the water in the second temperature discharge passage such that when The water in the second temperature discharge passage reaches a predetermined temperature limit, the second temperature control valve opens, wherein the first predetermined temperature is substantially higher than the second predetermined temperature.

26. The system of claim 25 wherein the first and second temperature discharge passages have outlets adapted for fluid connection to the discharge passage.

27. The system of claim 25 wherein the first and second temperature discharge passages merged downstream of their respective temperature control valves.

28. The system of claim 25 wherein the predetermined temperature limit of the first temperature control valve is from about 90 degrees Fahrenheit to about 120 degrees Fahrenheit.

29. The system of claim 25 wherein the predetermined temperature limit of the second temperature control valve is from about 30 degrees Fahrenheit to about 40 degrees Fahrenheit.

* * * * *